United States Patent
Breton et al.

(10) Patent No.: US 9,511,791 B2
(45) Date of Patent: Dec. 6, 2016

(54) MOTOR VEHICLE COMPRISING MEANS FOR POSITIONING A COLLAPSIBLE STEERING COLUMN

(71) Applicant: RENAULT s.a.s., Boulogne-Billancourt (FR)

(72) Inventors: Xavier Breton, Guyancourt (FR); Laurent Lanarre, La Celle Saint Cloud (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/777,234

(22) PCT Filed: Jan. 20, 2014

(86) PCT No.: PCT/FR2014/050098
§ 371 (c)(1),
(2) Date: Sep. 15, 2015

(87) PCT Pub. No.: WO2014/140437
PCT Pub. Date: Sep. 18, 2014

(65) Prior Publication Data
US 2016/0046319 A1    Feb. 18, 2016

(30) Foreign Application Priority Data

Mar. 15, 2013  (FR) ...................................... 13 52307

(51) Int. Cl.
*B62D 1/19*  (2006.01)
*B62D 1/189*  (2006.01)

(52) U.S. Cl.
CPC .............. *B62D 1/192* (2013.01); *B62D 1/189* (2013.01); *B62D 1/195* (2013.01); *B62D 1/197* (2013.01)

(58) Field of Classification Search
CPC combination set(s) only.
See application file for complete search history.

(56) References Cited

U.S. PATENT DOCUMENTS 4,746,144 A * 5/1988 Kulczyk ................ B62D 1/192
                                                    280/777
4,752,085 A * 6/1988 Yamamoto ............. B62D 1/181
                                                    280/775

(Continued)

FOREIGN PATENT DOCUMENTS

DE    44 21 509    12/1995
EP    1 721 806    11/2006

OTHER PUBLICATIONS

International Search Report Issued Apr. 25, 2014 in PCT/FR2014/050098 Filed Jan. 20, 2014.

(Continued)

*Primary Examiner* — Nicole Verley
(74) *Attorney, Agent, or Firm* — Oblon, McClelland, Maier & Neustadt, L.L.P.

(57) ABSTRACT

A motor vehicle includes a bodyshell structure which delimits at least one passenger compartment and one front compartment that are separated by an upper transverse cross member. The vehicle includes a steering column that is coupled in the engine compartment to a steering system and that extends into the passenger compartment by passing under the cross member. The steering column is adjustable in inclination between extreme minimum and maximum angular positions. The steering column is also collapsible longitudinally by a safety device in the event of an impact. The column can angularly repositioned by moving the column from the maximum inclined position to a given, less inclined angular position, which can be activated no later than the time of longitudinal collapse of the column to facilitate the collapse.

7 Claims, 1 Drawing Sheet

(56) References Cited

U.S. PATENT DOCUMENTS

| | | | | |
|---|---|---|---|---|
| 5,074,161 A | * | 12/1991 | Hancock | B62D 1/192 |
| | | | | 280/777 |
| 5,876,065 A | * | 3/1999 | Ogura | B62D 1/197 |
| | | | | 280/777 |
| 6,032,981 A | | 3/2000 | Imanishi et al. | |
| 6,216,552 B1 | * | 4/2001 | Friedewald | B62D 1/195 |
| | | | | 188/371 |
| 8,579,327 B2 | * | 11/2013 | Klos | B62D 1/184 |
| | | | | 280/775 |
| 2004/0012186 A1 | | 1/2004 | Andersson | |
| 2013/0133461 A1 | * | 5/2013 | Tinnin | B62D 1/195 |
| | | | | 74/493 |
| 2013/0305870 A1 | * | 11/2013 | Streng | B62D 1/192 |
| | | | | 74/493 |

OTHER PUBLICATIONS

French Search Report Issued Nov. 29, 2013 in French Application 1352307 Filed Mar. 15, 2013.

* cited by examiner

MOTOR VEHICLE COMPRISING MEANS FOR POSITIONING A COLLAPSIBLE STEERING COLUMN

BACKGROUND

The invention relates to a motor vehicle.

More specifically, the invention relates to a motor vehicle comprising a bodyshell structure which delimits at least one passenger compartment and one front compartment that are separated by an upper transverse cross member, said vehicle having a telescopic steering column that is coupled in the engine compartment to a steering system and that extends into the passenger compartment by passing under the cross member, said steering column being adjustable in inclination between extreme minimum and maximum angular positions, potentially being adjustable in length, and being collapsible longitudinally by a safety device in the event of an impact.

Numerous examples of motor vehicles of this type are known.

In such vehicles, the steering column can both be extended or collapsed, and tilted. Such steering columns can therefore occupy extreme positions relating to passenger morphologies falling outside the norm.

In these extreme positions, and in particular in certain inclined positions, the angle formed between the steering column and the floor of the vehicle does not enable the optimal collapse of the steering column by the safety device in the event of impact, in particular the steering wheel arranged at one upper extremity of the steering column may come into contact with an element of the driver's compartment and hamper said collapse.

The failure of the steering column of the vehicle to collapse in the event of impact may result in injury to the driver of the vehicle.

BRIEF SUMMARY

The invention overcomes this drawback by proposing a vehicle as described previously including means for the prior repositioning of the steering column in a position that permits same to be collapsed by the safety device in the event of impact.

For this purpose, the invention proposes a motor vehicle as described previously, characterized in that it includes means for angularly repositioning the column that can move the column from the high inclined position of same to a given, less inclined angular position, which can be activated no later than the time of longitudinal collapse of the column to facilitate said collapse.

According to other features of the invention:
the angular positioning means are synchronized with activation of the safety device,
the angular positioning means include at least one guided element that is rigidly connected to a tube of the steering column and that can cooperate with guide means rigidly connected to the bodyshell structure of the vehicle,
the guide means are carried on the cross member,
the guided element comprises a deflector that is carried on the upper rear portion of the tube of the steering column arranged behind the cross member, and which forms an inclined surface oriented towards the front of the steering column,
the guide means carried on the cross member include a bearing face, which slides against the steering column in the maximum inclined position of same, and that is able to push the steering column downwards when the deflector comes into contact with said bearing face when the rear portion of the tube of the steering column carrying said deflector is collapsed longitudinally beneath said bearing face,
the bearing face is inclined at an angle equal to the angle of the inclined face of the deflector,
the bearing face is carried on an edge of a flat plate attached beneath the cross member,
behind the deflector, the guided element has a surface parallel to the axis of the steering column to enable the tube of the column to be guided beneath the flat plate when the steering column is collapsed.

BRIEF DESCRIPTION OF THE DRAWINGS

Other features and advantages of the invention are given in the detailed description below, provided with reference to the attached drawings, in which.

DETAILED DESCRIPTION

In the description below, identical reference signs refer to identical parts or parts having similar functions.

Figure 1:
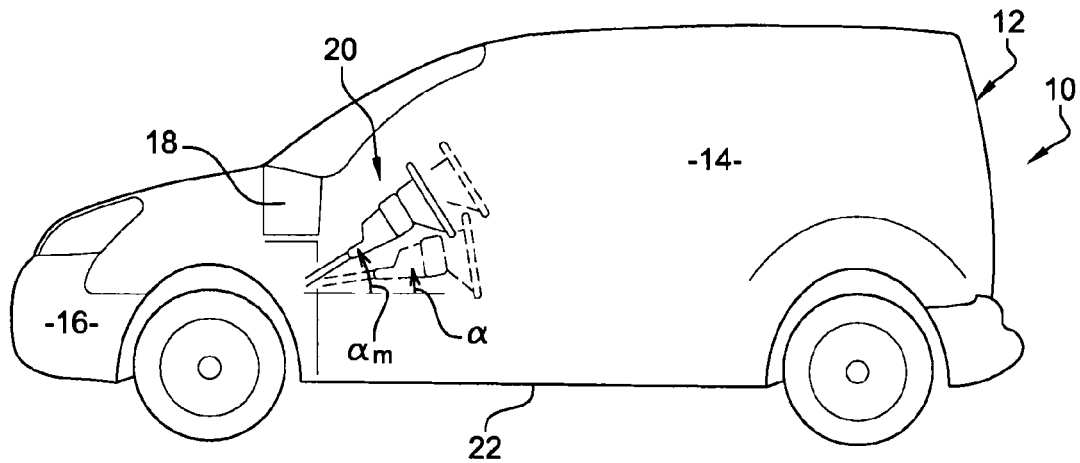
FIG. 1 is a schematic view of a motor vehicle according to the invention.
Figure 2:
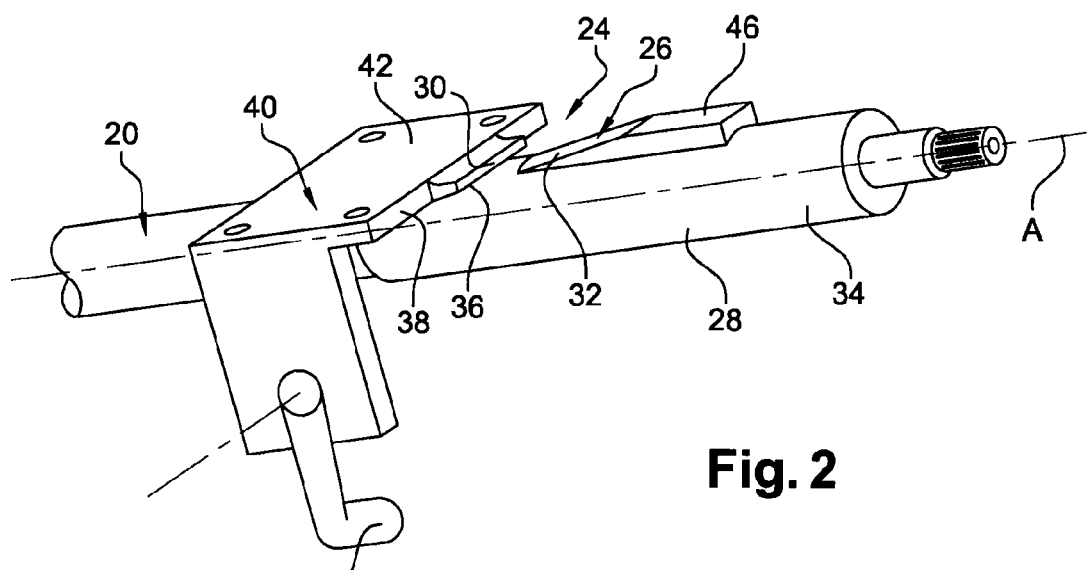
FIG. 2 is a perspective view showing the position of a steering column according to the invention in relation to the angular positioning means in a highly inclined angular position.
Figure 3:
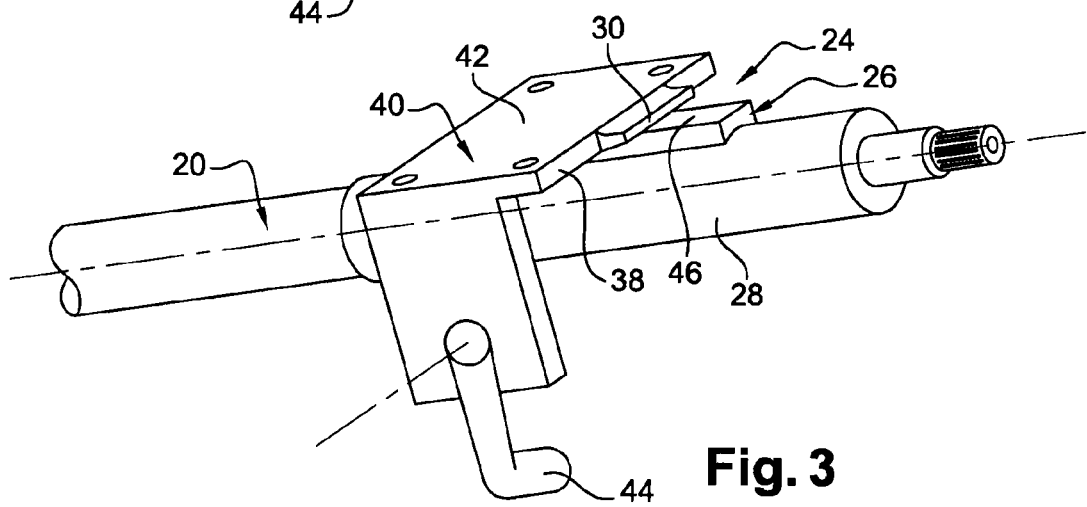
FIG. 3 is a perspective view showing the steering column in FIG. 2 during longitudinal collapse of same.

FIG. 1 shows a motor vehicle 10 having a bodyshell structure 12 that delimits at least one passenger compartment 14 and one front compartment 16 that are separated by an upper transverse cross member 18.

In a known manner, the vehicle 10 includes a telescopic steering column 20 that is coupled in the engine compartment to a steering system (not shown) and that extends into the passenger compartment 14, passing beneath the cross member 18.

As shown in FIG. 1, the inclination of the steering column 20 can be adjusted in relation to the floor 22 of the vehicle, in particular between extreme minimum and maximum angular positions, of which the maximum position "$\alpha_m$" is shown. The steering column is therefore able to occupy a plurality of positions "$\alpha$" of angular inclination alpha in relation to said floor 22.

Furthermore, the telescopic steering column 20 can adopt several adjusted-length arrangements, as shown using dotted lines in FIG. 1.

This known design from the prior art nonetheless has a drawback related to the inclination of the telescopic steering column 20.

Indeed, in the position of maximum inclination "$\alpha_m$" of same, the angle formed between the steering column 20 and the floor 22 of the vehicle hampers the collapse of the column 20 because, for example, during collapse, a steering wheel (not shown) arranged at a top extremity of said steering column bears against an element in the driver's compartment (not shown), which includes the dashboard, and consequently hampers the collapse.

Thus, in certain impacts suffered by the vehicle in this position, the steering column 20 may fail to collapse, thereby causing injury to said driver.

The invention overcomes this drawback by proposing means for repositioning the steering column that facilitate the collapse of same in the event of impact.

For this purpose, the invention proposes a motor vehicle 10 as described previously, characterized in that it includes means 24 for positioning the column 20 that can move the column from the high inclined position "$\alpha_m$" of same to a given, less inclined angular position, which can be activated no later than the time of longitudinal collapse of the column 20 to facilitate said collapse. The term "high inclined position" is used to distinguish between the positions with an inclination greater than the angular position deemed to be optimal for which the collapse is effected along the entire collapse path without encountering any obstacle en route.

These angular positioning means for the column may take numerous different forms.

In particular, a vertical movement of the steering column 20 caused by a controlled pyrotechnic device activated in the event of impact is perfectly conceivable.

Nonetheless, the invention has the advantage of simply and efficiently using the longitudinal collapsing movement of the column to cause the angular repositioning of the column to a suitable inclination.

Accordingly, the angular positioning means 24 include at least one guided element 26 that is rigidly connected to a tube 28 of the steering column and that can cooperate with guide means 30 rigidly connected to the bodyshell structure of the vehicle.

In the preferred embodiment of the invention, the guide means 30 are preferably carried on an element of the bodyshell structure of the vehicle, with a high degree of rigidity to prevent collapse of the column from causing said guide means to be moved or deformed.

For this purpose, the guide means 30 are carried on the cross member 18, which is shown in FIG. 1.

More specifically, the guided element 26 comprises a deflector 32 that is carried on the upper rear portion 34 of the tube 28 of the steering column 20, and which forms an inclined surface oriented towards the front of the steering column 20.

Indeed, since the guided element is designed to cooperate with the guide means 30 carried on the cross member, the guided element 26 needs to be arranged in front of the cross member 18 so that collapse of the steering column 20 causes said guided element 26 to cooperate with the guide means 30.

The guide means 30, carried on the cross member 18, has a bearing face 36 that slides against the steering column 20, and more specifically the tube 28 of the steering column 20 in the maximum inclined position of said steering column 20.

Thus, the guide means 30 can push the steering column 20 downwards when the deflector 32 comes into contact with said bearing face 36 when the rear portion 34 of the tube 28 of the steering column 20, carrying said deflector 32, is collapsed longitudinally beneath the bearing face 30.

At the time of contact between the guide means and the deflector, there are impacts of very high force, around 2000 N, which could adversely affect the collapse without hampering it.

The bearing face may be of any shape.

Nonetheless, for the deflector 32 to cooperate with the bearing face 30 as gradually as possible, the bearing face 36 is preferably inclined at an angle equal to the angle of the inclined surface of the deflector 32.

Preferably, the contact surface of the deflector 32 is covered with plastic to mitigate the impacts at the time of contact and friction between the guide means 30 and the deflector.

Advantageously, to ensure optimal rigidity of the bearing face 36, same is carried on an edge 38 of a plate 40 of which one face 42 is attached beneath the cross member, as shown previously in FIG. 1.

The plate 40 can therefore notably perform other functions, such as carrying the means for adjusting the steering column 20, and an adjustment lever 44 can also be carried on the plate 40 for this purpose.

Finally, to ensure that the guided element 26 is guided beneath the guide means 30 along the entire collapse path of the steering column 20, the guided element 26 includes, behind the deflector 32, a surface that is parallel to the axis "A" of the steering column 20, this surface 46 being designed to enable the tube 28 of the column 20 to be guided beneath the plate 40 during collapse of the steering column 20.

The invention therefore advantageously ensures that a steering column 20 with an adjustable incline can be repositioned in the event of an impact to ensure optimal collapse.

The invention claimed is:

1. A motor vehicle comprising:
a bodyshell structure which delimits at least one passenger compartment and one front compartment that are separated by an upper transverse cross member;
a steering column that is coupled in the front compartment to a steering system and that extends into the passenger compartment by passing under the cross member, said steering column being adjustable in inclination between extreme minimum and maximum angular positions, and being collapsible longitudinally by a safety device in the event of an impact; and
means for angularly repositioning the column that can move the column from the maximum angular position to a given, less inclined angular position, which can be activated no later than the time of longitudinal collapse of the column to facilitate said collapse,
wherein the angular repositioning means are synchronized with activation of the safety device, and
wherein the angular repositioning means include at least one guided element that is rigidly connected to a tube of the steering column and that can cooperate with guide means rigidly connected to the bodyshell structure of the vehicle.

2. The motor vehicle as claimed in claim 1, wherein the guide means are carried on the cross member.

3. The motor vehicle as claimed in claim 1, wherein:
the guided element comprises a deflector that is carried on an upper rear portion of the tube-of the steering column arranged behind the cross member, and which forms an inclined surface oriented towards a front of the steering column, and
the guide means are carried on the cross member and include a bearing face, which slides against the steering column in the maximum angular position, and that is able to push the steering column downwards when the deflector comes into contact with said bearing face when the upper rear portion of the tube of the steering column carrying said deflector is collapsed longitudinally beneath said bearing face.

4. The motor vehicle as claimed in claim 3, wherein the bearing face is inclined at an angle equal to the angle of the inclined surface of the deflector.

5. The motor vehicle as claimed in claim 4, wherein the bearing face is carried on an edge of a flat plate attached beneath the cross member.

6. The motor vehicle as claimed in claim 5, wherein behind the deflector, the guided element has a surface parallel to an axis of the steering column to enable the tube of the column to be guided beneath the flat plate when the steering column is collapsed.

7. The motor vehicle as claimed in claim 3, wherein a surface of the deflector that comes into contact with said bearing face when the upper rear portion of the tube of the steering column carrying said deflector is collapsed longitudinally beneath said bearing face is covered with plastic.

* * * * *